(12) United States Patent
Lin et al.

(10) Patent No.: US 11,759,984 B1
(45) Date of Patent: Sep. 19, 2023

(54) DAMPING PAD WITH LOW COMPRESSION SET

(71) Applicant: Hertide Material Co., Taichung (TW)

(72) Inventors: Ming-Hui Lin, Taichung (TW); Sung-Yen Kung, Taichung (TW)

(73) Assignee: HERTIDE MATERIAL CO., Taichung (TW)

( * ) Notice: Subject to any disclaimer, the term of this patent is extended or adjusted under 35 U.S.C. 154(b) by 0 days.

(21) Appl. No.: 17/698,575

(22) Filed: Mar. 18, 2022

(30) Foreign Application Priority Data

Jan. 27, 2022 (TW) .................................. 111103627

(51) Int. Cl.
| | |
|---|---|
| *B32B 5/18* | (2006.01) |
| *B29C 44/42* | (2006.01) |
| *B29C 44/02* | (2006.01) |
| *B32B 5/20* | (2006.01) |
| *B32B 5/32* | (2006.01) |
| *B29L 31/58* | (2006.01) |

(Continued)

(52) U.S. Cl.
CPC .............. *B29C 44/42* (2013.01); *B29C 44/02* (2013.01); *B32B 5/18* (2013.01); *B32B 5/20* (2013.01); *B32B 5/32* (2013.01); *B29K 2021/003* (2013.01); *B29L 2031/58* (2013.01); *B32B 27/36* (2013.01); *B32B 2266/0292* (2013.01); *B32B 2305/022* (2013.01); *B32B 2307/56* (2013.01)

(58) Field of Classification Search
CPC .......... B32B 5/18; B32B 5/32; B32B 2307/56
See application file for complete search history.

(56) References Cited

U.S. PATENT DOCUMENTS

| | | | | |
|---|---|---|---|---|
| 2012/0322905 | A1* | 12/2012 | Kusanose | ........... C08L 23/0853 521/139 |
| 2013/0197118 | A1* | 8/2013 | Bollmann | .......... C08G 18/4018 521/172 |
| 2021/0079188 | A1* | 3/2021 | Baghdadi | ............. A43B 13/188 |

FOREIGN PATENT DOCUMENTS

| | | |
|---|---|---|
| CN | 106084447 A | 11/2016 |
| CN | 106133041 A | 11/2016 |

(Continued)

OTHER PUBLICATIONS

Crow, Shore Durometer Conversion Chart, 2015, p. 1-2; https://polymerdatabase.com/polymer physics/Shore Table.html.*

(Continued)

*Primary Examiner* — Mark Ruthkosky
*Assistant Examiner* — Julia L Rummel
(74) *Attorney, Agent, or Firm* — Sinorica International Patent & Trademark

(57) ABSTRACT

Provided is a damping pad with low compression set, which is prepared by a method comprising the following steps: (1) providing a polymer comprising a thermoplastic ether ester elastomer, in which the polymer material has specific melt flow index, Shore D hardness, tensile modulus, density, and elongation at break; (2) melting the polymer material to obtain a molten polymer material; (3) adding nitrogen gas or carbon dioxide into the molten polymer to obtain a mixture; (4) turning the mixture into a supercritical state and compounding the mixture, to obtain a supercritical fluid blend; and (5) injecting and molding the supercritical fluid blend to obtain the damping pad with low compression set which has compression set of 40% or less, deceleration value of 20 or less, and rebound resilience of 50% or more.

6 Claims, 5 Drawing Sheets

(51) Int. Cl.
    *B29K 21/00*         (2006.01)
    *B32B 27/36*         (2006.01)

(56)            References Cited

FOREIGN PATENT DOCUMENTS

| | | |
|---|---|---|
| CN | 111331770 A | 6/2020 |
| CN | 112646325 A | 1/2021 |
| JP | H05-302022 A | 11/1993 |
| JP | H11-323110 A | 11/1999 |
| JP | 2001261874 A | 9/2001 |
| JP | 2009-029895 A | 2/2009 |
| JP | 2010132802 A | 6/2010 |
| JP | 2016532737 A | 10/2016 |
| JP | 2021508350 A | 3/2021 |
| TW | 200916518 A | 4/2009 |
| TW | 201400533 A | 1/2014 |
| TW | I729300 B | 6/2021 |
| WO | 2020017450 A1 | 1/2020 |

OTHER PUBLICATIONS

Allen, P. "Testing Dynamic Shock Absorption in Footwear", 2018, p. 1-4; https://www.satra.com/bulletin/article.php?id=2002.*
ASTM International; Standard Test Method for Open Cell Content of Rigid Cellular Plastics; Designation D6226-21; Published Feb. 2021; 100 Barr Harbor Drive, PO Box C700, West Conshohocken, PA 19428-2959, USA; 8 pages.

* cited by examiner

DAMPING PAD WITH LOW COMPRESSION SET

CROSS-REFERENCE TO RELATED APPLICATION

Pursuant to 35 U.S.C. § 119(a), this application claims the benefit of the priority to Taiwan Patent Application No. 111103627, filed on Jan. 27, 2022. The content of the prior application is incorporated herein by its entirety.

BACKGROUND OF THE INVENTION

1. Field of the Invention

The present disclosure relates to a damping pad with low compression set, especially a damping pad prepared by injection molding with a supercritical fluid.

2. Description of the Prior Arts

The polymers applied for damping pads nowadays comprises ethylene-vinyl acetate (EVA), polyurethane (PU), polyolefin elastomer (POE), olefin block copolymer (OBC), and the like.

Conventionally, most damping pads are made of thermosetting materials, such as rubber, PU or EVA, wherein the EVA damping pads are light-weight pads with shock-absorbing property, and broadly applied in a variety of industries. However, chemical additives are needed in the production of the damping pads made of these thermosetting materials, and the byproducts resulting from the reduction of these chemical additives may remain in the damping pads and cause damages to human bodies and our environment. In addition, crosslinking reactions occur during the above production process because cross-linking agents are added, and this leads to a problem that the final products cannot be recycled.

Thermoplastic elastomers (TPEs) such as POE and OBC are flexible, durable, soft and recyclable. However, the products of POE have lower adhesiveness and compression set and partially cross-linking reaction is still needed to improve the compression set, so the products of POE cannot be recycled. In addition, products of OBC also have poor adhesiveness. Although the compression set of the products of OBC is slightly better than that of the products of POE, it is insufficient and needs to be improved.

Other thermoplastic elastomers include thermoplastic polyurethane (TPU), thermoplastic polyolefin (TPO), thermoplastic vulcanizate (TPV), thermoplastic styrene (TPS), thermoplastic rubber (TPR), and thermoplastic amide (TPA). However, all these thermoplastic elastomers have excessively high compression set (higher than 40%), which is disadvantages for damping pads.

In the above-mentioned thermoplastic elastomers, TPU is broadly applied as the materials of damping pads because it has high strength, toughness, abrasion resistance and oil resistance, and it has better rebound resilience and durability than EVA, and better abrasion resistance than natural rubbers. However, although TPU damping pads have advantages and can be recycled, it still have several disadvantages resulting from the properties of the material itself and cannot be improved: (1) inferior compression set (higher than 40%): the damping pads are deformed after long-term use which causes dents in the pads and lowers rebound resilience; (2) yellowing and hydrolysis: the damping pads have inferior weather resistance and are aged or degraded easily under sunshine, which cannot be avoided over time even if an anti-oxidant and a light stabilizer are added during the production process.

Several replacement materials of TPU have been provided, and one of the materials with great potential is copolyester elastomers (COPEs) which is composed of polyester hard segments, such as polybutylene terephthalate (PBT) and polyethylene terephthalate (PET), and aliphatic polyester soft segments, such as polycaprolactone (PCL), or aliphatic polyether soft segments, such as polyethylene glycol (PEG), polyoxypropylene glycol (PPG), poly(tetramethylene ether)glycol (PTMEG) and the like. COPEs have good mechanical strength, rebound resilience, impact resistance, bending durability, chemical resistance and weather resistance, and they are mainly applied for car parts, track pads, industrial products, sports and leisure products, electric parts, cable wires, and the like.

Since the existing TPU damping pads have inferior compression set (higher than 40%), it still needs to find a polymer material to prepare damping pads that simultaneously have low compression set, high damping property and high rebound resilience. In addition, the preparation method of the damping pads also needs to be improved in order to prepare damping pads by using recyclable materials with superior properties and improve the performance of the damping pads.

In COPEs composed of a variety of soft and hard segments, thermoplastic ether ester elastomer (TEEE) composed of PBT and PTMEG is emphasized. However, TEEE has high crystallinity and cannot be foamed easily, so TEEE is hardly applied to damping pads or other related products.

SUMMARY OF THE INVENTION

To overcome the shortcomings, one objective of the present invention is to provide a damping pad that simultaneously has low compression set, high damping property (i.e. with low deceleration g value) and high rebound resilience.

Another objective of the present disclosure is to prepare a damping pad by using a recyclable polymer material, thereby transforming waste plastic material into new high value products.

To achieve the above objectives, the present disclosure provides a damping pad with low compression set, wherein the damping pad with low compression set is prepared by a method comprising the following steps: (1) providing a polymer material comprising a thermoplastic ether ester elastomer, in which the polymer material has a melt flow index at 230° C. of 4 grams/10 minutes (g/10 min) to 18 g/10 min, Shore D hardness of 20D to 48D, tensile modulus of 20 million pascals (MPa) to 70 MPa, density of 1.0 gram per cubic centimeter (g/cm$^3$) to 1.3 g/cm$^3$, and elongation at break of 300% or more; (2) melting the polymer material to obtain a molten polymer material; (3) adding nitrogen or carbon dioxide into the molten polymer material to obtain a mixture; (4) turning the mixture into a supercritical state and compounding the mixture, to obtain a supercritical fluid blend; and (5) injecting and molding the supercritical fluid blend to obtain the damping pad with low compression set; wherein the damping pad with low compression set comprises a surface layer and a foam inner layer, and the foam inner layer is covered by the surface layer; the thickness of the surface layer is 0.05% to 1.50% of the total thickness of the damping pad with low compression set; the foam inner layer comprises a plurality of pores, the pores comprised in the foam inner layer comprise a plurality of closed pores and a plurality of open pores, and the open pores are in a proportion of 30% or more; and the damping pad with low compression set has Shore C hardness of 30C to 60C, average density of 0.10 g/cm³ to 0.35 g/cm³, compression set of 40% or less, deceleration g value of 20 or less, and rebound resilience of 50% or more.

The present disclosure chooses or recycles a polymer material having the melt flow index, Shore D hardness, tensile modulus, density and elongation at break in specific ranges, and combines the polymer material and injection molding technique with a supercritical fluid, to successfully obtain a damping pad having a structure with a specific proportion of open pores, and simultaneously having low compression set, high damping property and high rebound resilience. The polymer material can be recycled TEEE or commercially available TEEE, and the proportion of soft and hard segments does not need to be intentionally adjusted. In addition, injection molding technique with a supercritical fluid is used to foam the damping pad and no high-volatile chemical foaming agent such as pentane is needed. Therefore, no toxic substance will be produced, and no fire safety or pollution concerns will be caused, and the products can be applied even more broadly. It should be understood that the desired polymer material may be chosen according to its melt flow index, Shore D hardness, tensile modulus, density and elongation at break or prepared by compounding, thereby obtaining the damping pad with low compression set of the present disclosure.

In some embodiments, the thermoplastic ether ester elastomer comprises monomers represented by the following Formula (I) and Formula (II):

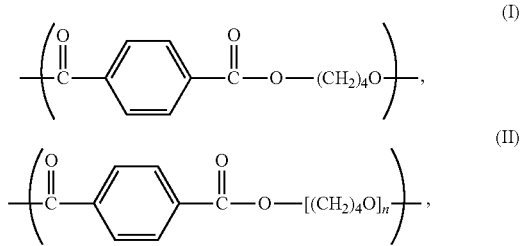

wherein monomer represented by Formula (I) has an amount of 10 percent by weight (wt %) to 45 wt %; monomer represented by Formula (II) has an amount of 55 wt % to 90 wt %; and n is an integer between 3 and 35.

In some embodiments, n in Formula (II) may be 4, 5, 6, 7, 8, 9, 10, 20, 30.

In some embodiments, the polymer material may be 100 wt % of the thermoplastic ether ester elastomer. In some embodiments, the polymer material further comprises a modified thermoplastic elastomer. In some embodiments, the modified thermoplastic elastomer may be thermoplastic polyurethane, thermoplastic poly(ether-block-amide) copolymer or a combination thereof. Preferably, the modified thermoplastic elastomer may be thermoplastic polyurethane.

In some embodiments, the thermoplastic poly(ether-block-amide) copolymer may be commercially available product Pebax®, which is a thermoplastic elastomer composed of hard polyamide segments and soft polyether segments.

In some embodiments, the thermoplastic polyurethane has Shore A hardness of 80A to 95A. In some embodiments, the thermoplastic polyurethane can be used as a foaming enhancer.

In some embodiments, the polymer material comprises the thermoplastic ether ester elastomer having an amount of from 70 wt % or more to less than 100 wt %, and the thermoplastic polyurethane having an amount of from more than 0 wt % to 30 wt % or less. In some embodiments, the polymer material comprises the thermoplastic ether ester elastomer having an amount of from 80 wt % or more to less than 100 wt %, and the thermoplastic polyurethane having an amount of from more than 0 wt % to 20 wt % or less.

In some embodiments, the polymer material further comprises one or more additives, and the additives may be a tackifier, a processing aid such as silica or talc, an antioxidant, an ultraviolet absorber, a hindered amine compound, a lubricant, a filler, a flame retardant, a flame retardant additive, a release agent, an antistatic agent, a molecular modifier such as a peroxide, a metal deactivator, an organic or inorganic nucleating agent, a neutralizing agent, an antacid, an antiseptic, a fluorescent brightener, an organic or inorganic pigment, an organic or inorganic compound to offer flame retardance or thermal stability, and the like.

In some embodiments, the polymer material has a melt flow index at 230° C. of 4.5 g/10 min to 18 g/10 min, or 4.7 g/10 min to 16 g/10 min, or 5 g/10 min to 10 g/10 min.

In some embodiments, the polymer material has Shore D hardness of 30D to 45D.

In some embodiments, the polymer material has tensile modulus of 20 MPa to 50 MPa, or 20 MPa to 30 MPa, or 23 MPa to 28 MPa.

In some embodiments, the polymer material has density of 1.0 g/cm³ to 1.25 g/cm³, or 1.0 g/cm³ to 1.10 g/cm³, or 1.03 g/cm³ to 1.07 g/cm³.

In some embodiments, the polymer material has elongation at break of 300% or more, or 300% to 600%, or 300% to 500%.

In some embodiments, nitrogen is added in the step (3), and the mixture is turned into the supercritical state of nitrogen in the step (4), that is, with a temperature higher than the critical temperature of nitrogen, −147° C. (corresponding to 126.2 K), and a pressure higher than the critical pressure of nitrogen, 3.4 MPa (corresponding to 34 bars). In some embodiments, carbon dioxide is added in the step (3), and the mixture is turned into the supercritical state of carbon dioxide in the step (4), that is, with a temperature higher than the critical temperature of carbon dioxide, 31° C. (corresponding to 304.1 K), and a pressure higher than the critical pressure of carbon dioxide, 7.38 MPa (corresponding to 73.8 bars). In some embodiments, the step (4) is conducted at a temperature of 190° C. to 230° C. and a pressure of 127 bars.

In some embodiments, the step (5) is conducted in a mold, and the mold has a delayed venting time in mold of 0.0 second (sec.) to 0.8 sec.

In some embodiments, the preparation method further comprises a step (6): cooling the damping pad with low compression set in the mold. In some embodiments, the preparation method further comprises a step (6): cooling the damping pad with low compression set.

In some embodiments, the damping pad with low compression set is prepared by a vertical injection molding machine or a horizontal injection molding machine. In some embodiments, the damping pad with low compression set is prepared by a vertical injection molding machine.

In some embodiments, the surface layer comprises a plurality of pores, the pores comprised in the surface layer have a long diameter of 5 micrometers (μm) to 100 μm, or 10 μm to 95 μm, or 20 μm to 90 μm, or 30 μm to 80 μm, or 40 µm to 70 µm, or 50 µm to 60 µm. In the present disclosure, the pores comprised in the surface layer are irregularly-shaped, and the term "long diameter" indicates the longest inner diameter of the pores comprised in the surface layer.

In some embodiments, the thickness of the surface layer equals to 0.05% to 1.00%, or 0.10% to 0.50%, or 0.15% to 0.45%, or 0.20% to 0.40%, or 0.25% to 0.35%, or 0.30% to 0.35% of the total thickness of the damping pad with low compression set.

In some embodiments, the pores comprised in the foam inner layer (i.e., closed pores and open pores) have a long diameter of 100 µm to 400 µm, or 150 µm to 350 µm, or 200 µm to 300 µm, or 250 µm to 300 µm. Smaller long diameter of the pores comprised in the foam inner layer is advantageous for rebound resilience; and longer long diameter of the pores comprised in the foam inner layer is advantageous for damping effect.

In some embodiments, the open pores may be in a proportion of 40% or more, 50% or more, 60% or more, 70% or more or 75% or more in the foam inner layer. In some embodiments, the open pores may be in a proportion of 30% to 90% in the foam inner layer. In the present disclosure, the pores comprised in the foam inner layer are irregularly-shaped, and the long diameter of the pores comprised in the foam inner layer indicates the longest inner diameter of the pores comprised in the foam inner layer. In the present disclosure, the pores comprised in the foam inner layer of the damping pad with low compression set are filled with air, wherein the term "closed pores" indicates pores formed from single nucleation point; and the term "open pores" indicates pores formed by two or more closed pores with one or more through holes formed between the closed pores. When the closed pores are in a higher proportion, the damping pad with low compression set has a higher rebound resilience; however, the deceleration g value is also increased, which is disadvantageous for the damping effect.

In some embodiments, the damping pad with low compression set has a total thickness of about 2 centimeters (cm), and the surface layer has an average thickness of about 30 µm to 150 µm.

In some embodiments, the damping pad with low compression set has a Shore C hardness of 30C to 50C.

In some embodiments, the damping pad with low compression set has an average density of 0.1 g/cm$^3$ to 0.3 g/cm$^3$, 0.1 g/cm$^3$ to 0.2 g/cm$^3$, or 0.2 g/cm$^3$ to 0.3 g/cm$^3$.

In some embodiments, the damping pad with low compression set has a compression set of 13% to 27%, or 13.5% to 26.5%.

In some embodiments, the damping pad with low compression set has a deceleration g value of 13.5 to 19. The deceleration g value is an indicator of the damping effect for shoe materials, and a low deceleration g value means good damping effect.

In some embodiments, the damping pad with low compression set has rebound resilience of 60% or more, or 50% to 80%, or 65% to 68%.

In some embodiments, the damping pad prepared by the method disclosed in the present disclosure has compression set of 40% or less, deceleration g value of 20 or less, rebound resilience of 60% or more.

DETAILED DESCRIPTION OF THE PREFERRED EMBODIMENTS

Other objectives, advantages and novel features of the invention will become more apparent from the following detailed description when taken in conjunction with the accompanying drawings.

Preparation of Damping Pads

Figure 1:
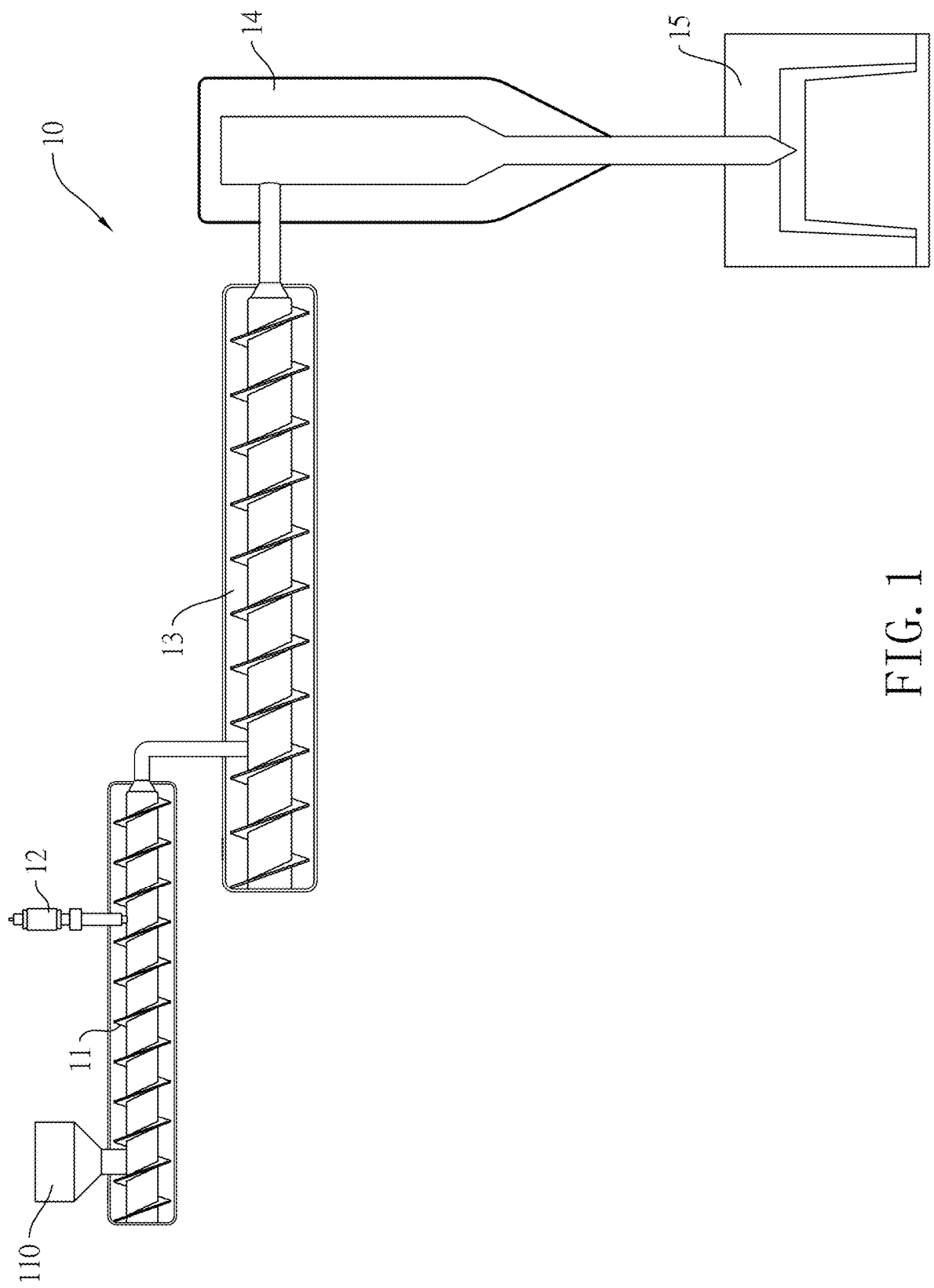
FIG. 1 is a schematic diagram of the vertical injection molding machine used in Examples of the present disclosure.

The damping pad of the present disclosure is prepared by using the vertical injection molding machine 10 shown in FIG. 1, but the general horizontal injection molding machine can also be used for the preparation. The injection molding machine 10 comprises a first screw barrel 11, a gas introduction part 12, a second screw barrel 13, an injector 14 and a mold 15. First of all, a polymer material comprising a thermoplastic ether ester elastomer was provided. The polymer material having a melt flow index at 230° C. of 4 g/10 min to 18 g/10 min, Shore D hardness of 20D to 48D, tensile modulus of 20 MPa to 70 MPa, density of 1.0 g/cm$^3$ to 1.3 g/cm$^3$, elongation at break of 300% of more was chosen for the preparation.

As shown in Table 1, the polymer material used in Examples 1 and 4 was thermoplastic ether ester elastomer (TEEE), and the polymer materials used in Examples 2 and 3 were compositions composed of a thermoplastic ether ester elastomer and a thermoplastic polyurethane (TPU). The thermoplastic ether ester elastomers used herein were commercially available thermoplastic ether ester elastomers: DuPont 4068 or DuPont 3078. The thermoplastic polyurethane used herein was BASF 1185A.

Properties of the polymer material used in Examples 1 to 4 were examined as below. The results are listed in the following Table 1.

A1. Melt flow index (MI): examined according to the standard method ISO 1133.

A2. Shore D hardness: examined according to the standard method ISO 868.

A3. Tensile modulus: examined according to the standard method ISO 527.

A4. Density: examined according to the standard method ISO 1183.

A5. Elongation at break: examined according to the standard method ISO 527.

As shown in FIG. 1, the polymer materials of Examples 1 to 4 were respectively fed into the first screw barrel 11 through a feeding hopper 110. The pressure and temperature of the first screw barrel 11 were respectively set at 33 bars and 190° C. to 230° C. In the first half part of the first screw barrel 11 (the left part of the first screw barrel 11 in FIG. 1), the polymer material was molten to obtain a molten polymer material; then nitrogen gas was added into the molten polymer material in the first screw barrel 11 through the gas introduction part 12, and the molten polymer material and the nitrogen gas were homogeneously mixed in the second half part of the first screw barrel 11 (the right part of the first screw barrel 11 in FIG. 1) to obtain a mixture. After that, the mixture was introduced into the second screw barrel 13. The pressure and temperature of the second screw barrel 13 were respectively set at 127 bars and 190° C. to 230° C., which is at the supercritical condition of nitrogen, so the mixture in the second screw barrel 13 could be turned to the supercritical state and then compounding the mixture, to obtain a supercritical fluid blend.

The supercritical fluid blend was introduced into the injector 14 at the end of the second screw barrel 13, and the supercritical fluid blend was injected into a mold 15 at a pressure of 127 bars and a temperature of 190° C. to 230° C. for injection molding, to obtain a damping pad. In Table 1, the amount of blend refers to the amount of the supercritical fluid blend introduced into the mold 15 in weight, charging time refers to the time for charging the supercritical fluid blend in the injector 14, and the injecting time refers to the time of injecting the supercritical fluid blend from the injector 14 into the mold 15.

At the moment of injecting the supercritical fluid blend into the mold 15, the pressure dramatically reduced from 127 bars to 23 bars or 15 bars, and nitrogen gas was rapidly released from the supercritical fluid blend to form multiple nucleation points, and then nitrogen at the nucleation points expanded to form tiny bubbles, just like bubbles formed when opening a carbonated drink bottle. In Examples 1 to 4, venting holes were disposed on the upper and lower walls of the mold 15 (not shown in FIG. 1). In the injection molding of Examples 1 to 4, the supercritical fluid blend was injected into the mold 15 at the same time of opening the venting holes of the mold 15, so the delayed venting time in mold was 0.0 sec. At last, the damping pad was left in the mold 15 for cooling, to obtain the damping pad with low compression set.

TABLE 1

|  |  | Example 1 | Example 2 | Example 3 | Example 4 |
|---|---|---|---|---|---|
| Polymer material | Composition | TEEE | 95% TEEE + 5% TPU | 80% TEEE + 20% TPU | TEEE |
|  | TEEE | Dupont 4068 | Dupont 4068 | Dupont 4068 | Dupont 3078 |
|  | Melt flow index (g/10 min) | 8.8 | 7.0 | 18.0 | 5 |
|  | Shore D hardness (D) | 37 | 36 | 38 | 30 |
|  | Tensile modulus (MPa) | 45 | 28 | 22 | 21 |
|  | Density (g/cm³) | 1.11 | 1.10 | 1.12 | 1.07 |
|  | Elongation at break (%) | >300 | >300 | >500 | >300 |

TABLE 1-continued

|  |  | Example 1 | Example 2 | Example 3 | Example 4 |
|---|---|---|---|---|---|
| | Temperature set for injection molding machine (° C.) | 225 | 200 | 195 | 190 |
| Mold | Amount of blend (g) | 141 | 141 | 109 | 120 |
|  | Injecting speed (mm/s) | 120 | 120 | 120 | 120 |
|  | Pressure measured (bar) | 23 | 23 | 23 | 15 |
|  | Delayed venting time in mold (sec.) | 0.0 | 0.00 | 0.0 | 0.0 |
|  | Venting time (sec.) | 1.591 | 1.591 | 1.049 | 1.275 |
|  | Pressure in mold before venting (bar) | 24 | 15 | 23 | 16 |
| Injector | Charging time (sec.) | 58 | 58 | 37 | 37 |
|  | Injecting time (sec.) | 0.699 | 0.699 | 0.699 | 0.612 |

Figure 2A:
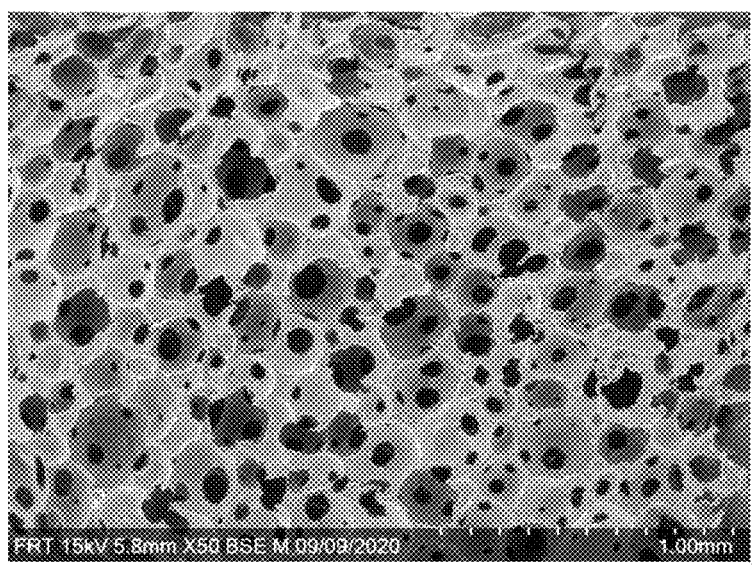
FIG. 2A is a SEM photograph of the cross section of the foam inner layer of the damping pad with low compression set obtained in Example 1 of the present disclosure with a magnification of 50×.
Figure 2B:
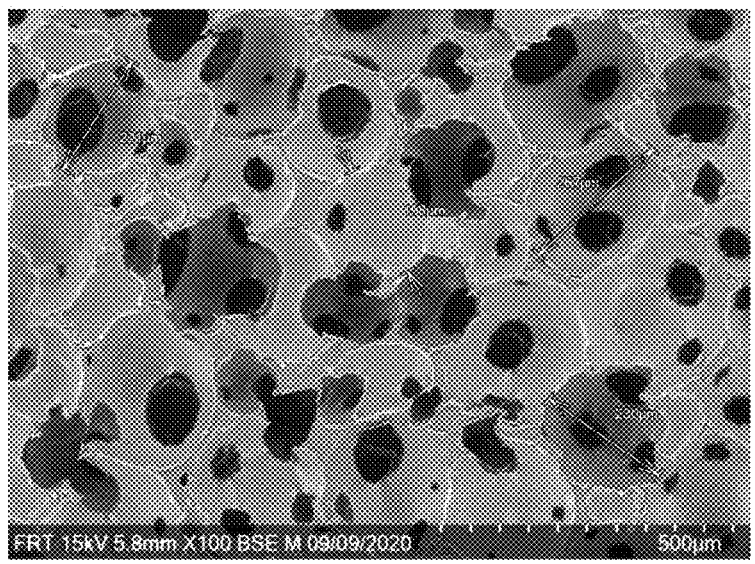
FIG. 2B is a SEM photograph of the cross section of the foam inner layer of the damping pad with low compression set obtained in Example 1 of the present disclosure with a magnification of 100×.
Figure 2C:
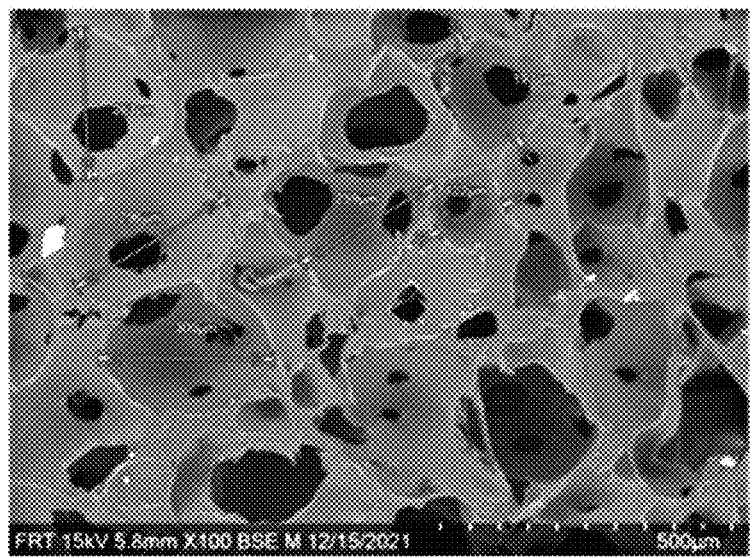
FIG. 2C is another SEM photograph of the cross section of the foam inner layer of the damping pad with low compression set obtained in Example of the present disclosure with a magnification of 100×.
Figure 2D:
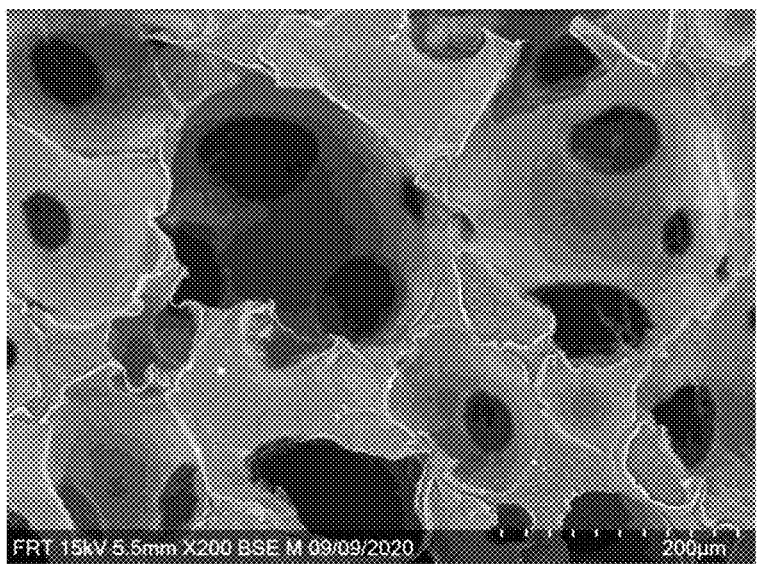
FIG. 2D is a SEM photograph of the cross section of the foam inner layer of the damping pad with low compression set obtained in Example 1 of the present disclosure with a magnification of 200×.
Figure 2E:
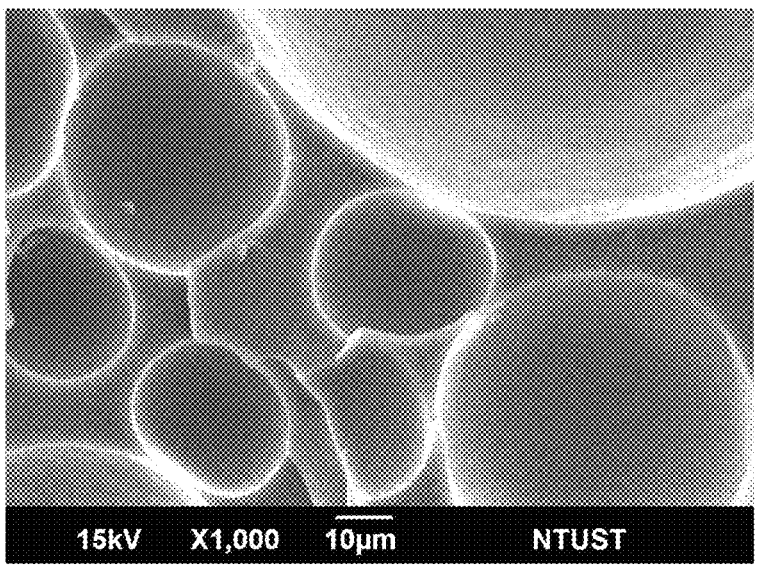
FIG. 2E is a SEM photograph of the cross section of the surface layer of the damping pad with low compression set obtained in Example 1 of the present disclosure with a magnification of 1000×.

The damping pads of Examples 1 to 4 were prepared in accordance with the above-mentioned preparation method, and the cross sections of the damping pads of Examples 1 to 4 were observed by a scanning electron microscope (SEM). The cross sections of the foam inner layer of the damping pad obtained in Example 1 are shown FIGS. 2A to 2D, with a magnification of 50× in FIG. 2A, 100× in FIGS. 2B and 2C, and 200× in FIG. 2D. The cross section of the surface layer of the damping pad obtained in Example 1 is shown in FIG. 2E, with a magnification of 1000×.

Figure 3A:
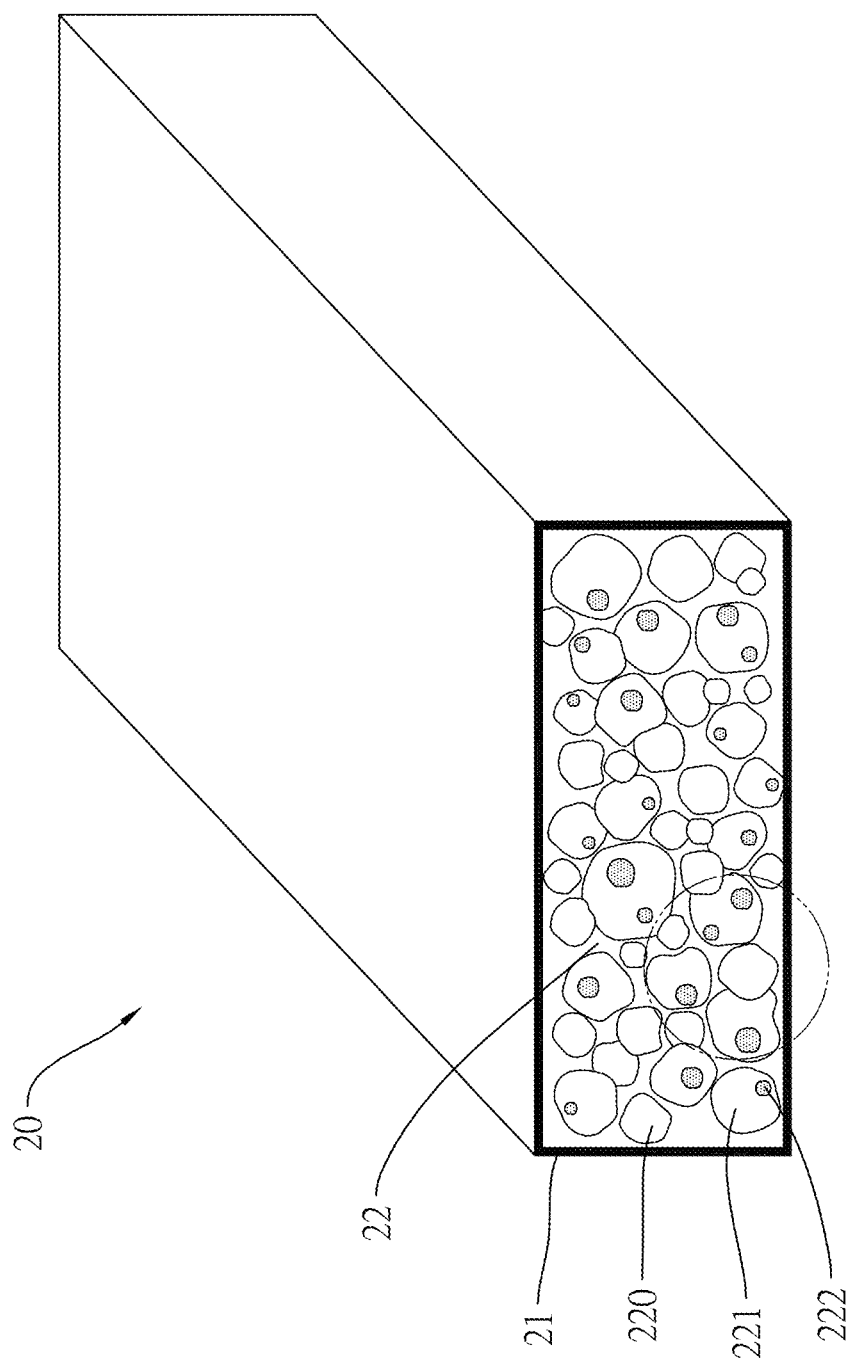
FIG. 3A is a schematic diagram of the damping pad with low compression set of the present disclosure.
Figure 3B:
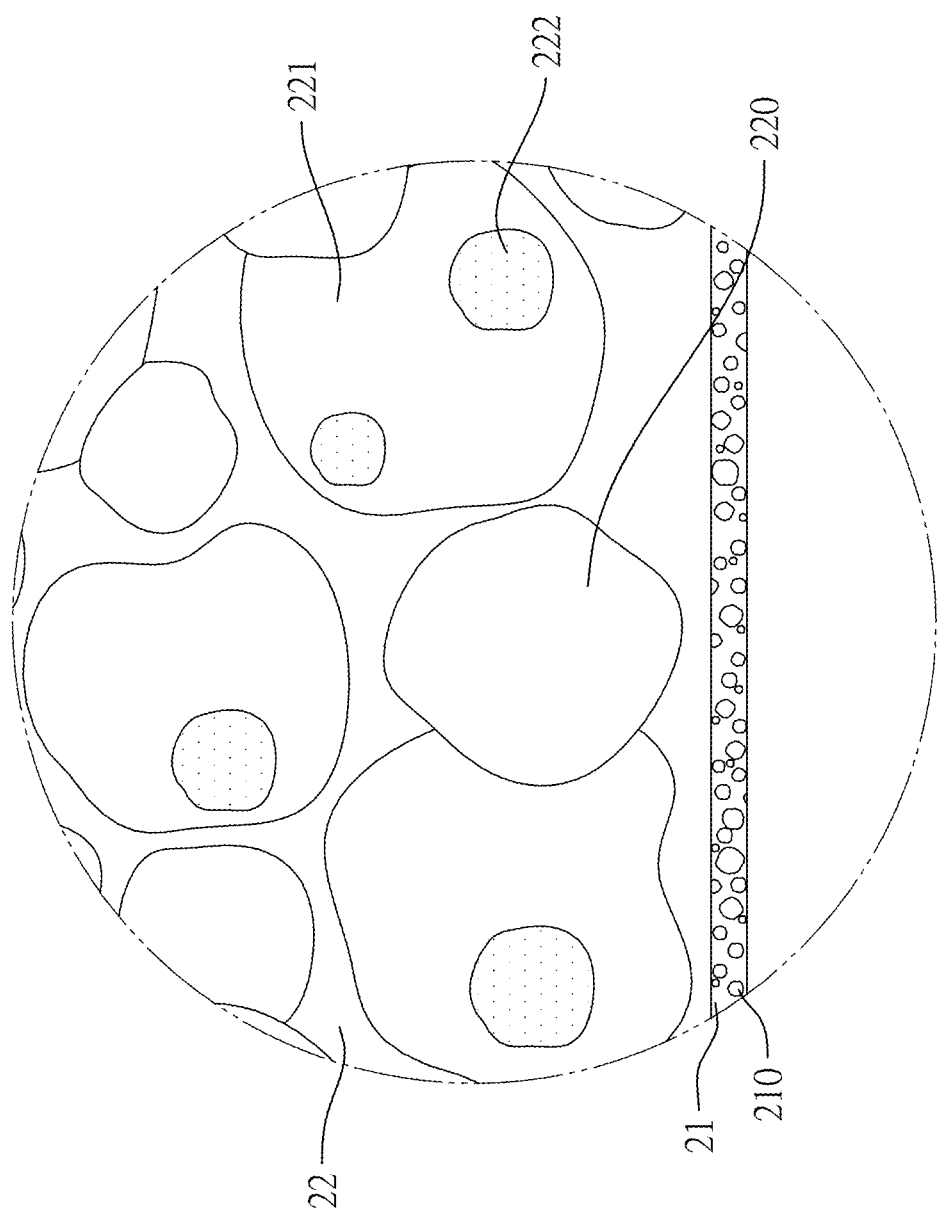
FIG. 3B is a schematic diagram of partial enlargement of the damping pad with low compression set of the present disclosure.

FIG. 3A is a schematic diagram of the damping pad 20 of the present disclosure, and FIG. 3B is a schematic diagram of partial enlargement of FIG. 3A. As shown in FIGS. 3A and 3B, the damping pad 20 comprises a surface layer 21 and a foam inner layer 22, and the foam inner layer 22 is covered by the surface layer 21. The surface layer 21 and the foam inner layer 22 are made of a material comprising a thermoplastic ether ester elastomer. The surface layer 21 comprises a plurality of pores 210 comprised in the surface layer 21, in which the pores 210 comprised in the surface layer 21 have a long diameter of 5 μm to 100 μm, and the thickness of the surface layer 21 is 0.05% to 1.50% of the total thickness of the damping pad 20. The foam inner layer 22 comprises a plurality of pores 220, 221 comprised in the foam inner layer 22, in which the pores 220, 221 comprised in the foam inner layer 22 have a long diameter of 100 μm to 400 μm. The pores 220, 221 comprised in the foam inner layer 22 comprise a plurality of closed pores 220 and a plurality of open pores 221, wherein any of the open pores 221 comprises at least one through hole 222 which connects the open pore 221 and another open pore 221. The open pores 221 are in a proportion of 30% or more. The shape of the pores is affected by the polymer material chosen and the pressure difference between the injector 14 and the mold 15.

The thickness of the damping pads 20 obtained in Examples 1 to 4, and the thickness of their surface layers 21 are respectively calculated. Additionally, properties of the damping pads 20 obtained in Examples 1 to 4 are respectively examined. The results are listed in the following Table 2.

B1. Proportion of open pores: examined according to the standard method ASTM D6226.

B2. Shore C hardness: examined according to the standard method ISO 868.

B3. Average density: examined according to the standard method ISO 1183.

B4. Compression set: examined according to the standard method CNS 3560.

B5. Deceleration g value: examined according to the standard method SATRA TM142.

B6. Rebound resilience: examined according to the standard method ASTM D 2632.

The results of the above calculations and examinations are listed in Table 2.

TABLE 2

|  |  | Example 1 | Example 2 | Example 3 | Example 4 |
|---|---|---|---|---|---|
| Polymer material | Composition | TEEE | 95% TEEE + 5% TPU | 80% TEEE + 20% TPU | TEEE |
|  | TEEE | Dupont 4068 | Dupont 4068 | Dupont 4068 | Dupont 3078 |
| Damping pad | Average thickness (cm) | 2.0 | 2.0 | 2.0 | 2.0 |
|  | Thickness of surface layer (μm) | 113 | 68 | 125 | 136 |
|  | Proportion of open pores in foam inner layer (%) | 62 | 32 | 76 | 72 |
|  | Shore C hardness (C) | 48 | 50 | 49 | 42 |
|  | Average density (g/cm$^3$) | 0.25 | 0.25 | 0.25 | 0.18 |
|  | Compression set (%) | 16.2 | 10.3 | 26.5 | 27.4 |
|  | Deceleration g value | 12.1 | 18.6 | 12.0 | 14.3 |
|  | Rebound resilience (%) | 68 | 76 | 66 | 61 |

From above, it should be clear that the thickness of the surface layer 21 is 0.05% to 1.50% of the total thickness of the damping pad with low compression set 20, and the open pores 221 are in a proportion of 30% or more; and the damping pad with low compression set 20 has Shore C hardness of 30C to 60C, average density of 0.10 g/cm$^3$ to 0.35 g/cm$^3$, compression set of 40% or less, deceleration g value of 20 or less, and rebound resilience of 50% or more. Such damping pad simultaneously has low compression set, high damping property and high rebound resilience, thereby resulting in excellent damping effect.

The damping pad of the present disclosure is prepared by injection molding technique with a supercritical fluid, and no chemical foaming agent is used. Therefore, no toxic substance will be produced, and no fire safety or pollution concerns will be caused. The product simultaneously has low compression set (≤40%), high damping property (with deceleration g value of ≤20) and high rebound resilience (≥50%), which results in excellent damping effect. In addition, the damping pad of the present disclosure can be prepared by using a commercially available thermoplastic ether ester elastomer resin or a recycled material, so the production threshold and cost can be obviously reduced, and the damping pad can be applied to more products.

What is claimed is:

1. A damping pad with low compression set, which is prepared by a method comprising the following steps:
    (1) providing a polymer material comprising a thermoplastic ether ester elastomer, in which the polymer material has a melt flow index at 230° C. of 4 g/10 min to 18 g/10 min, Shore D hardness of 20 to 48, tensile modulus of 20 MPa to 70 MPa, density of 1.0 g/cm$^3$ to 1.3 g/cm$^3$, and elongation at break of 300% or more;
    (2) melting the polymer material in a first half part of a first screw barrel to obtain a molten polymer material;
    (3) adding nitrogen or carbon dioxide into the molten polymer material and homogeneously mixing in a second half part of the first screw barrel to obtain a mixture;
    (4) introducing the mixture into a second screw barrel, and turning the mixture into a supercritical state and compounding the mixture, to obtain a supercritical fluid blend; and
    (5) introducing the supercritical fluid blend into an injector, and injecting and molding the supercritical fluid blend to obtain the damping pad with low compression set;
    wherein the damping pad with low compression set comprises a surface layer and a foam inner layer, and the foam inner layer is covered by the surface layer; the thickness of the surface layer is 0.05% to 1.50% of the total thickness of the damping pad with low compression set; the foam inner layer comprises a plurality of pores, the pores comprised in the foam inner layer comprise a plurality of closed pores and a plurality of open pores, and the open pores are in a proportion of 50% to 90% determined according to the standard method ASTM D6226; and the damping pad with low compression set has Shore C hardness of 30 to 60, average density of 0.10 g/cm$^3$ to 0.35 g/cm$^3$, compression set of 40% or less, deceleration g value of 20 or less, and rebound resilience of 50% or more.

2. The damping pad with low compression set of claim 1, wherein the polymer material further comprises thermoplastic polyurethane.

3. The damping pad with low compression set of claim 2, wherein the polymer material comprises the thermoplastic ether ester elastomer having an amount of from 70 wt % or more to less than 100 wt %, and the thermoplastic polyurethane having an amount of from more than 0 wt % to 30 wt % or less.

4. The damping pad with low compression set of claim 1, wherein the polymer material has the melt flow index at 230° C. of 5 g/10 min to 18 g/10 min.

5. The damping pad with low compression set of claim 1, wherein the polymer material has Shore D hardness of 30 to 45.

6. The damping pad with low compression set of claim 1, which has rebound resilience of 60% or more.

\* \* \* \* \*